United States Patent [19]
Verhaeg et al.

[11] Patent Number: 5,899,475
[45] Date of Patent: May 4, 1999

[54] VEHICLE HAVING WHEELS AND CASTORS

[75] Inventors: John Maria Verhaeg, Kingswinford; Donald Brookes, Stourbridge, both of United Kingdom

[73] Assignee: Sunrise Medical Limited, West Midlands, United Kingdom

[21] Appl. No.: 08/777,779

[22] Filed: Dec. 31, 1996

[51] Int. Cl.⁶ ............................................. B60B 33/00
[52] U.S. Cl. ........................ 280/250.1; 74/569; 16/35 D
[58] Field of Search .................. 16/35 D, 35 R, 16/44; 180/6.48, 6.5; 280/907, 98, 250.1

[56] References Cited

U.S. PATENT DOCUMENTS

| | | | |
|---|---|---|---|
| 2,557,275 | 6/1951 | Geisse | 16/44 |
| 2,688,149 | 9/1954 | Popp | 16/35 D |
| 3,924,292 | 12/1975 | Christensen | 16/35 |
| 4,212,093 | 7/1980 | Lombard | 16/35 D |
| 4,246,677 | 1/1981 | Downing et al. | 16/35 R |
| 4,280,246 | 7/1981 | Christensen | 16/35 D |
| 4,392,668 | 7/1983 | Mulholland | 280/721 |
| 4,432,116 | 2/1984 | Schultz | 16/35 D |
| 4,559,669 | 12/1985 | Bonzer et al. | 16/44 |
| 4,570,288 | 2/1986 | Kassai | 16/35 R |
| 4,614,246 | 9/1986 | Masse et al. | 180/6.5 |
| 4,763,910 | 8/1988 | Brandli et al. | 16/44 |
| 5,140,720 | 8/1992 | Sisler | 16/35 D |
| 5,214,823 | 6/1993 | Screen | 16/35 R |
| 5,275,248 | 1/1994 | Finch et al. | 180/65.5 |
| 5,762,155 | 6/1998 | Scheulderman | 180/907 |

FOREIGN PATENT DOCUMENTS

| | | |
|---|---|---|
| 0625 434 A1 | 11/1994 | European Pat. Off. . |
| 31 36 203 A1 | 4/1983 | Germany . |
| 2275029 | 8/1994 | United Kingdom . |
| WO 88/10109 | 12/1988 | WIPO ................ 180/907 |

*Primary Examiner*—Lanna Mai
*Assistant Examiner*—Andrew J. Fischer
*Attorney, Agent, or Firm*—Medlen & Carroll, LLP

[57] ABSTRACT

A vehicle such as a wheelchair having wheels by which the vehicle is propelled and steered and castors which support a proportion of the vehicle's weight, has its castors provided with biasing means which resists swivelling movement of the castors from the straight-ahead position thereby resisting an oversteer condition of the vehicle.

20 Claims, 7 Drawing Sheets

VEHICLE HAVING WHEELS AND CASTORS

BACKGROUND TO THE INVENTION

1. Field of the Invention

This invention relates to castors and to vehicles which have castors. More particularly, the invention relates to a vehicle which has wheels by which the vehicle is propelled and steered, and castors which support a proportion of the vehicle's weight and which swivel to appropriate orientations in accordance with the direction of travel of the vehicle. Preferably the wheels are at the front of the vehicle and the castors at the rear.

It is to be appreciated that when we refer to a castor, we mean an assembly in which a ground-engaging wheel is supported not only for rotation but also for swivelling movement about an axis, herein called a swivel axis, which is substantially vertically oriented in use and which is offset from the rotational axis of the wheel.

The invention has been devised in relation to a vehicle which is intended to be occupied by one person, to give mobility to that person if he or she is disabled or infirm. Such a vehicle is commonly known as a wheelchair, and for convenience will herein be referred to thus.

2. Description of Prior Art

Wheelchairs are known in which the front wheels provide for driving of the wheelchair but do not take any part in the steering thereof, whilst rear castors have their swivelling controlled by a servomechanism in order to steer the wheelchair. The front wheels may be driven by a common motor and a transmission arrangement which includes a differential to permit the wheels to rotate at different speeds when the wheelchair is cornering. Such known wheelchairs have a disadvantage in that the angle to which the castors can be swivelled in order to steer the chair is limited; if the castors are swivelled to too great an angle the castor wheels just skid sideways and have little or no influence on the direction of travel of the wheelchair. Thus there is a limit on manoeuvrability of the wheelchair: to turn the chair to face in the opposite direction requires a "three (or more) point turn" to be executed.

It is known in wheelchairs generally to provide for steering by differential driving of the driving wheels of the wheelchair. For example, the driving wheels may have separate electric driving motors and the wheelchair may be provided with a control system which is arranged appropriately to control the supply of electrical power to the two motors for steering the wheelchair. If a wheelchair of this type had the driven wheels at the front and castor wheels at the back, the position of the centre of gravity of the wheelchair with its occupant, usually is such that when the vehicle is steered while travelling forwardly an "oversteer" condition tends to exist, in which the rear end of the vehicle, unconstrained by the castor wheels, swings outwardly on a corner relative to the front of the wheelchair. Further, the directional stability of the wheelchair is such that very careful operation of the controls is necessary for the vehicle to run straight ahead, as the rear castors do not contribute to the directional stability of the wheelchair. Nevertheless, steering by differential driving of front wheels which do not undergo any steering pivotal movement is advantageous, because driving one front wheel forwardly while the other either is not driven at all or possibly even is driven rearwardly enables the vehicle to be turned in little more than its own length.

Wheelchairs with wheels and castors are disclosed in U.S. Pat. No. 4,614,246 and GB-2,275,029. In the latter, the castors have their swivelling axes inclined for restraining their swivelling movement. A further wheelchair with wheels and castors is disclosed in U.S. Pat. No. 5,275,248. Castors with means for controlling or biasing their swivelling movement are disclosed in U.S. Pat. No. 3,924,292, EP-0,625,434 and DE-3,136,203, while a shock absorbing wheel suspension assembly is disclosed by U.S. Pat. No. 4,392,668.

SUMMARY OF THE INVENTION

It is broadly the object of the present invention to overcome the above described disadvantages associated with conventional wheelchairs of which the front wheels are driven. It is to be appreciated that, in meeting this objective, the invention is also applicable to vehicles of other types and configurations.

According to one aspect of the present invention, we provide a vehicle having wheels by which the vehicle is propelled and steered and castors, wherein at least one of the castors incorporates biasing means for providing resistance to swivelling movement thereof from a straight-ahead position.

Preferably the wheels are at the front of the vehicle and the castors at the rear thereof.

The means for resisting swivelling of the castor from the straight-ahead position may comprise cam and follower means associated with parts of the castor which undergo relative angular movement when the castor swivels, the cam and following means causing relative displacement between said parts in a direction other than the angular swivelling movement, which relative displacement is resisted so as to resist the swivelling movement.

The relative movement in the other direction may be resisted by spring means, and/or by the proportion of weight of the vehicle carried by the castor.

Whilst it would be within the scope of the invention for the castor at each side of the vehicle to incorporate means which resists swivelling of the castor in both directions from a straight-ahead position, preferably the castor at one side of the vehicle has biasing means which comes into effect when steering in one direction from the straight-ahead position whilst the castor at the other side of the vehicle has biasing means which comes into effect when steering in the other direction from the straight-ahead position.

Preferably the castor at the left hand side of the vehicle has biasing means which comes into effect when the vehicle is steering to the right, whilst the castor at the right hand side of the vehicle has biasing means which comes into effect when the vehicle is steering left.

With such an arrangement of the castors, when the vehicle is travelling straight ahead either one or the other castor will resist small directional deviations therefrom. When the vehicle is turning to the left, weight is transferred to the right hand side of the vehicle and the right hand castor accordingly has most effect. When it is the proportion of the weight of the vehicle carried by the castor which provides the biasing action of the castor, the biasing action is increased in accordance with the cornering speed of the vehicle. This is what is required to resist the oversteering effect above referred to.

The use of castors in accordance with the invention also improves stability of a vehicle such as a wheelchair when traversing inclined surfaces, on rough ground, or when reversing.

In order to ensure that the castors do swivel when the vehicle is being steered, preferably the offset of the swivel axis from the rotational axis of the wheel of each castor is relatively large, e.g. of the order of the radius of the wheel. This ensures that the torque produced by steering of the vehicle is sufficient to overcome the effect of the biasing means of the castor.

Preferably each castor incorporates suspension means, i.e. means providing for upwards and downwards displacement of the castor wheel relative to the structure of the vehicle.

Preferably the suspension means comprises a pivoted arm by which the wheel is carried, pivotal movement of the arm relative to a further part of the castor assembly being resisted by resilient means. The resilient means may comprise a rubber or rubber-like element which is compressed upon the pivotal movement of the arm such that the wheel moves upwards relative to the vehicle.

The pivoted arm by which the wheel of the castor is carried is preferably a trailing arm, i.e. the rotational axis of the wheel is disposed rearwardly of the axis about which the arm is pivoted in the normal direction of movement of the castor. Such a trailing arm arrangement assists the wheel of the castor to surmount obstacles.

According to another aspect of the invention, we provide a castor having biasing means for resisting swivelling movement of the castor in at least one sense from a predetermined position.

Preferably the biasing means operates immediately upon the swivelling of the castor in one sense from the predetermined position, but provides no resistance to some swivelling in the other sense from the predetermined position.

BRIEF DESCRIPTION OF THE DRAWINGS

The invention also provides a castor having the suspension means above referred to.

The invention will now be described by way of example with reference to the accompanying drawings, of which.

DESCRIPTION OF PREFERRED EMBODIMENTS

Figure 1:
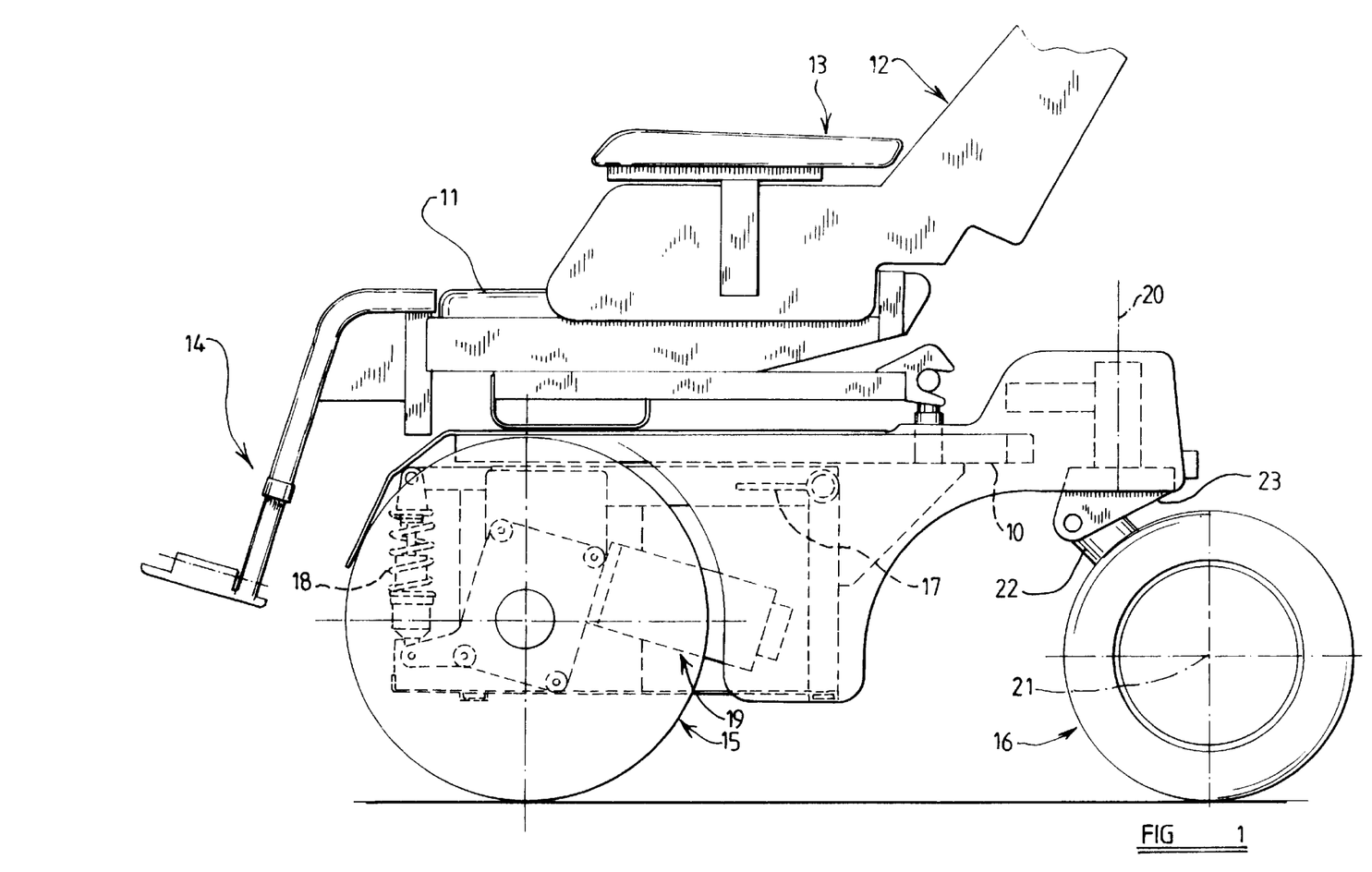
FIG. 1 is a diagrammatic side elevation of part of a wheelchair in accordance with one aspect of the invention.
Figure 2:
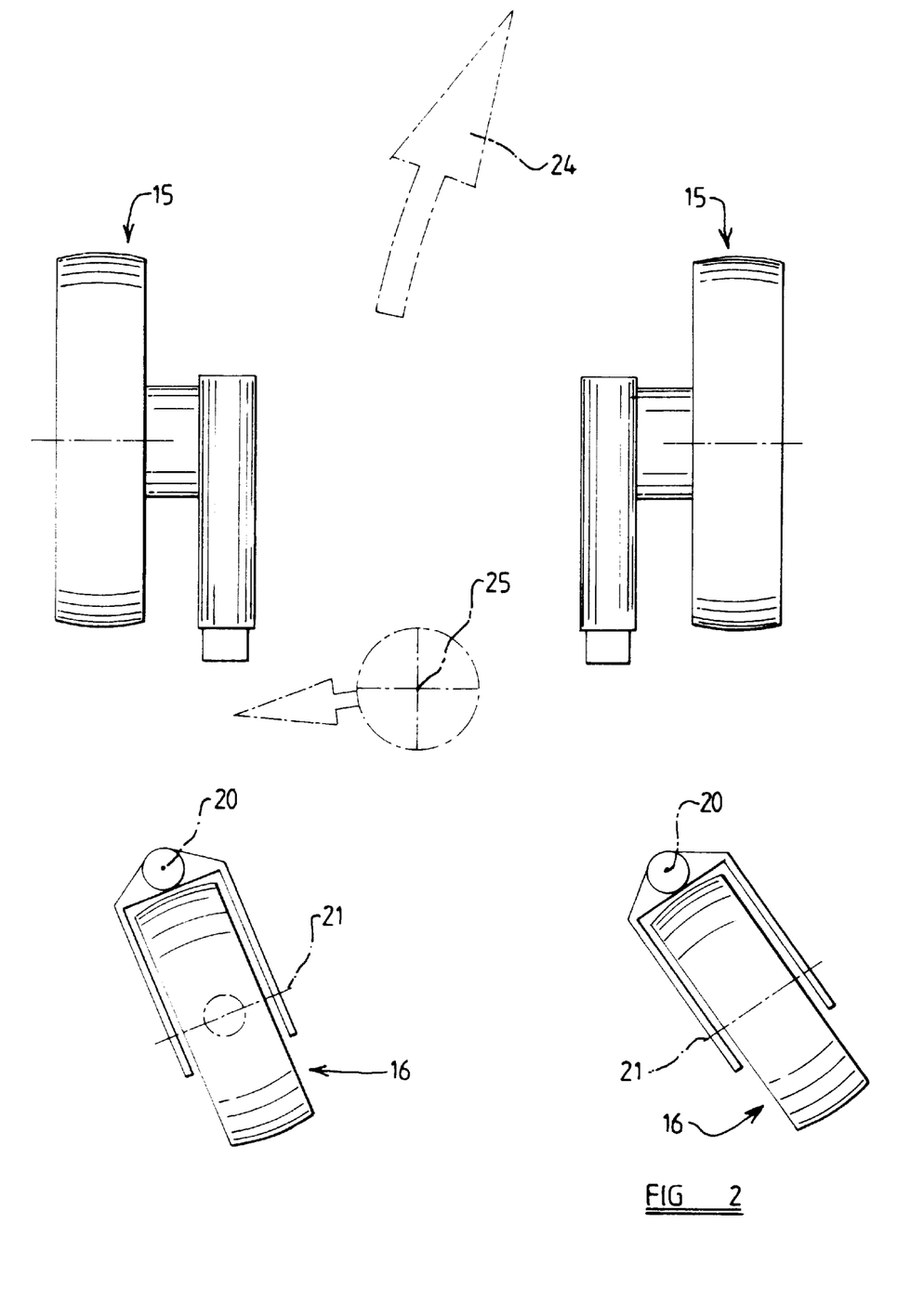
FIG. 2 is a diagrammatic plan view of the arrangement of the wheels of the wheelchair of FIG. 1.

Referring firstly to FIGS. 1 and 2 of the drawings, this shows diagrammatically, in side elevation, part of a wheelchair which has a chassis structure indicated generally at 10. The chassis structure carries a chair which has a seat cushion 11, backrest 12, and arm rests 13. The chair is readily detachable from the chassis 10, and further comprises a support indicated generally at 14 for the feet of an occupant of the chair.

The wheelchair has a pair of front wheels 15 and a pair of rear wheels 16. The front wheels are mounted to the chassis 10 of the wheelchair by respective pivoted arms one of which is indicated at 17 in FIG. 1, arranged so that the wheel is movable upwardly and downwardly in an arc relative to the chassis. Such movement of the wheel is controlled by a spring-damper unit 18. Each of the front wheels 15 has a respective electric drive motor 19 and reduction gearbox by which the wheel is able to be driven under the command of a suitable control system, electrical power being derived from a battery (not shown) carried by the wheelchair.

The rear wheels 16 of the vehicle comprise respective castors, the wheels being able to swivel about respective swivel axes 20 offset from the rotational axes 21 of the wheels. As shown in outline in FIG. 1, and described in greater detail hereafter, the wheel of each castor assembly is carried on an arm 22 which is itself pivotable relative to a swivelling body 23 of the castor, to provide for arcuate upwards and downwards movement of the castor wheel.

Referring now to FIG. 2 of the drawings, although the front wheels 15 of the wheelchair are able to move upwardly and downwardly relative to the chassis of the wheelchair they are not able to undergo any steering swivel movement. Steering of the wheelchair is effected by differentially controlling the power supply to the respective electric drive motors of the two front wheels so that one motor is, in effect, driven faster than the other when the vehicle is required to move other than in the straight ahead direction. When the wheelchair is steered in this manner, the castors at the rear of the wheelchair permit the rear wheels to swivel in accordance with the direction in which the wheelchair is being steered. FIG. 2 shows the condition wherein differential driving of the front wheels causes the vehicle to be steered to the right, as indicated by arrow 24. The position of the centre of gravity of the wheelchair is as indicated at 25, and it will be appreciated that when the vehicle is steered the effect of such disposition of the centre of gravity is that the rear of the vehicle tends to swing outwardly. The tendency is for the vehicle to oversteer, and for the rear wheels to swivel about their swivel axes 20 to a greater extent than would be necessary if there were no such oversteering tendency.

According to the present invention, therefore, the castors at the rear of the vehicle are provided with biasing means which causes such oversteering of the wheelchair to be resisted.

Figure 3:
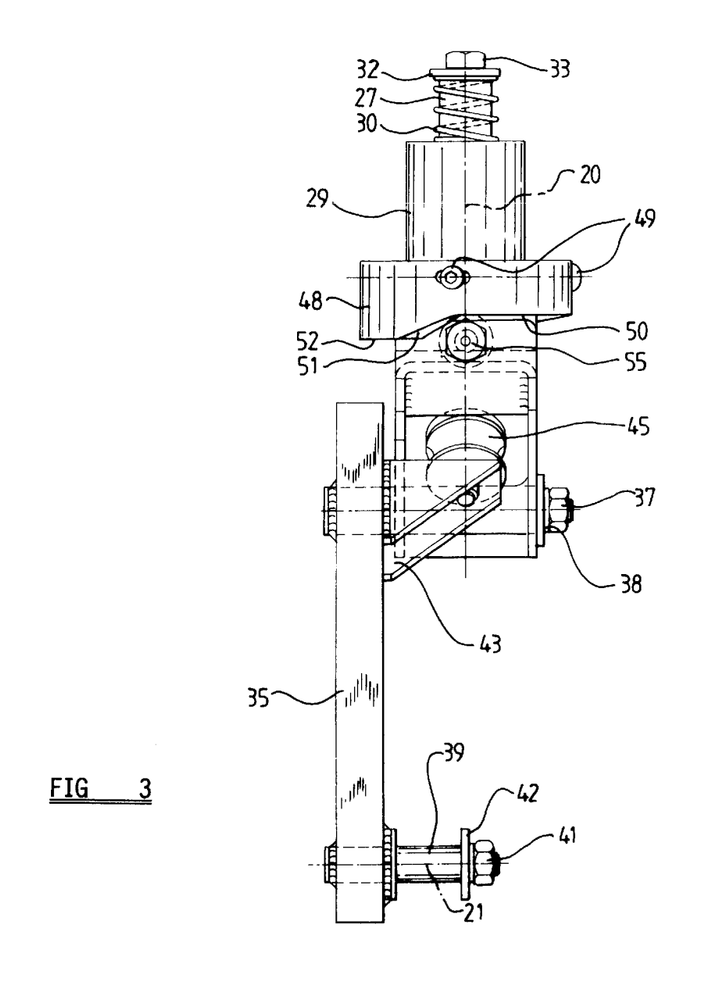
FIG. 3 is a rear elevation of the two castors of the wheelchair, with some detail omitted.
Figure 4:
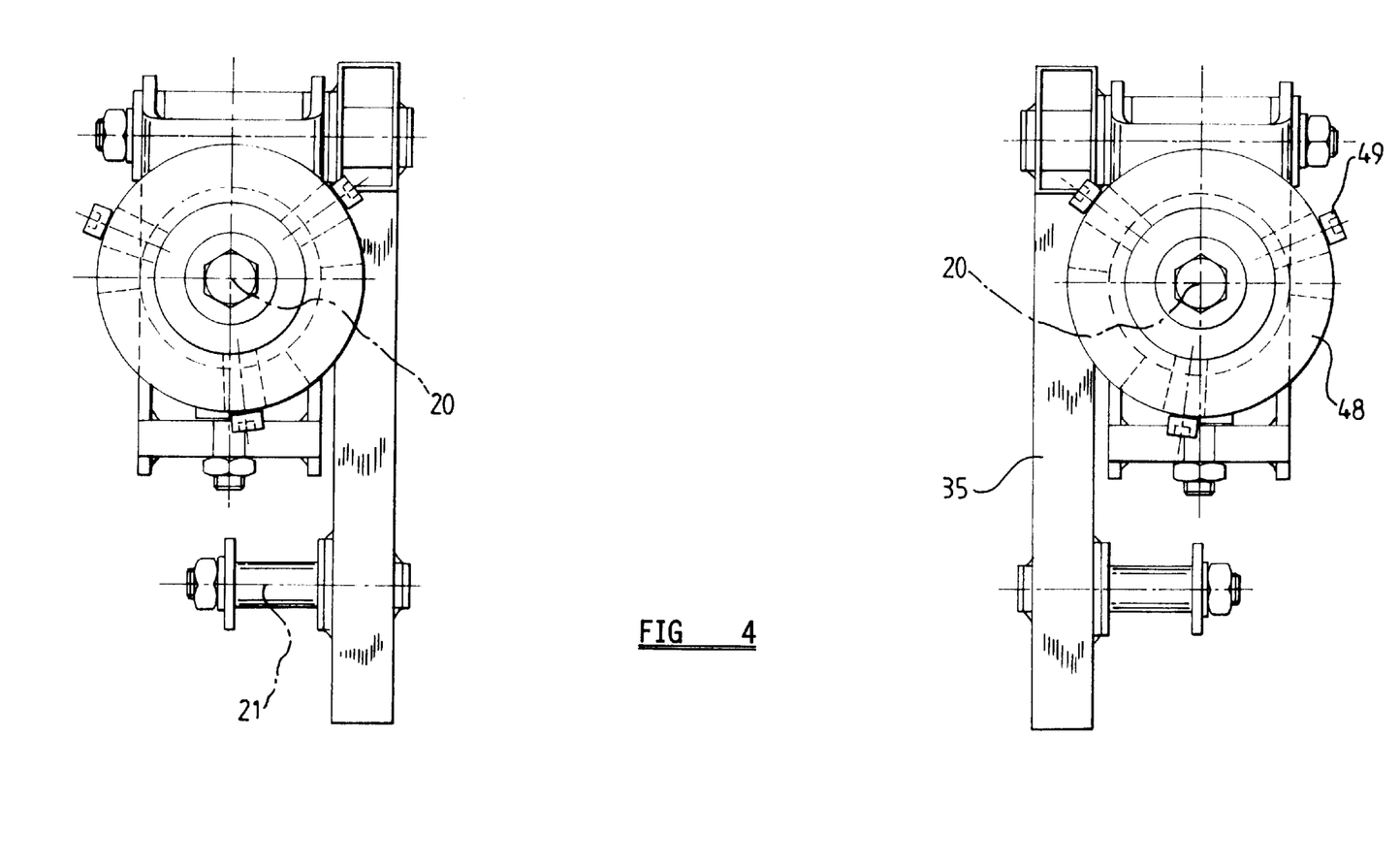
FIG. 4 is a plan view of the two castors of the wheelchair, also with some detail omitted.
Figure 5:
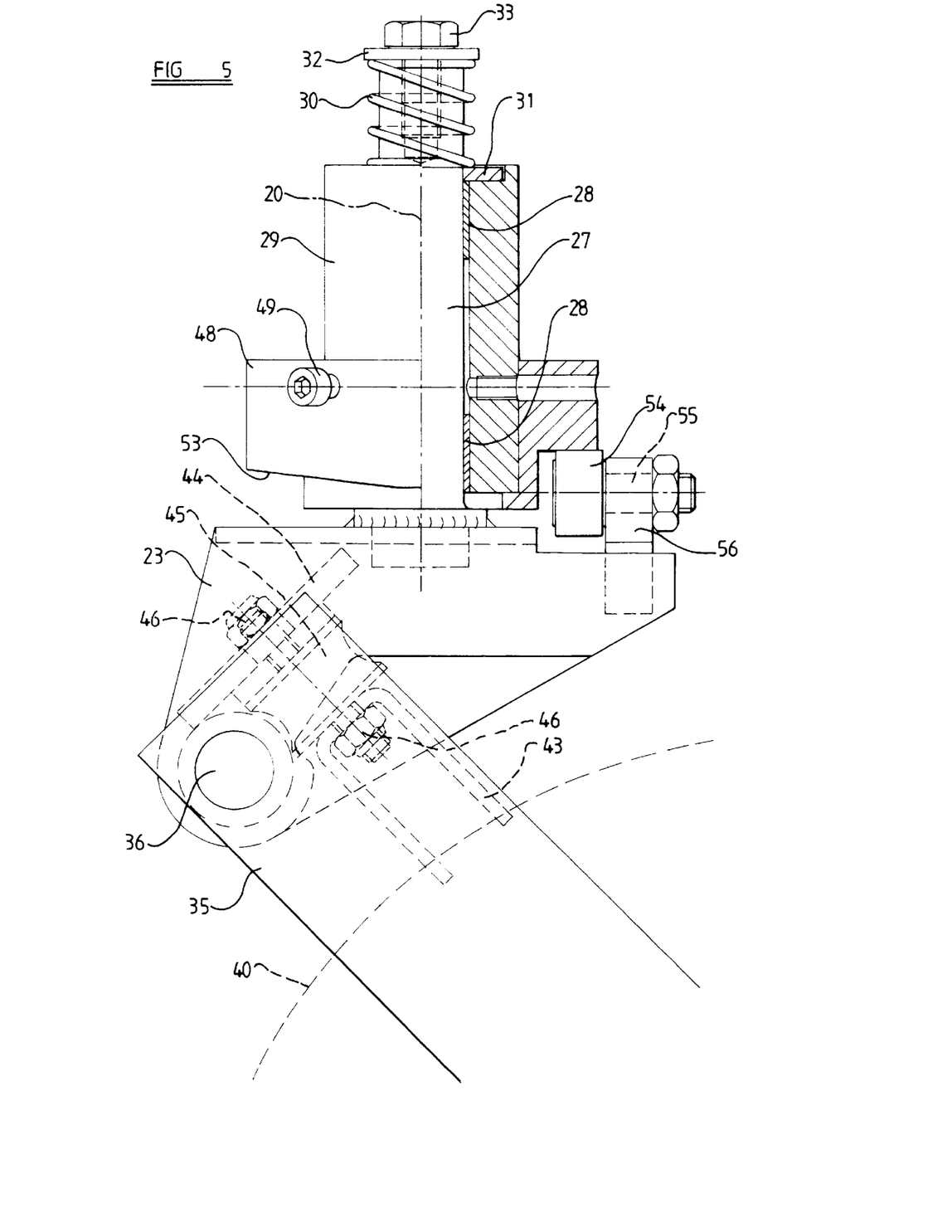
FIG. 5 is a side elevation, partly in section, of one of the castors.

Referring now to FIGS. 3, 4 and 5 of the drawings, FIGS. 3 and 4 show both castors at the rear of the vehicle. The castors at left and right of the vehicle are mirror images of one another, and accordingly in the following description only one of such castors will be described in detail, and the description of the castor at the other side of the vehicle will be confined to the differences thereof.

The castor at the right hand side of the vehicle has its swivel body 23, which is a generally U-section steel pressing, provided with an upwardly extending swivel pin 27 pivotable within bushes 28 in a sleeve 29. The pin 27 extends above the top of the sleeve 29, and carries a relatively light compression spring 30 whose opposite ends abut against a bearing washer 31 at the top of the sleeve 29 and an abutment washer 32 secured by a bolt whose head is shown at 33. Thus the body 23 is held captive to the sleeve 29 and biased upwardly relative thereto. It will be appreciated that the arrangement is such that the proportion of the weight of the wheelchair which is carried by the wheel of the castor also urges the body 23 upwardly relative to the sleeve 29, and the force exerted by the spring 30 is relatively low compared with the weight which is supported by the castor.

A suspension arm 35 is pivotally mounted to the body 23 by means of a pin 36 which is welded to the arm 35 and extends laterally through the body 23 being retained by a nut 37 and washer 38 at the free end of the pin. At its opposite end, arm 35 has welded thereto a spindle 39 on which is rotatably mounted the wheel of the castor, indicated in outline in FIG. 5 at 40. The wheel is retained by a nut 41 and washer 42. Adjacent the end of the arm 35 where the pin 36 is provided, a bracket 43 extends laterally from the arm and this faces an abutment 44 fixed in the body 23. A bonded metal-rubber-metal bush 45 is disposed between the facing parts of the bracket 43 and abutment 44, the bush being secured to these facing parts by respective studs which are connected to the metal parts of the bush between which the rubber is sandwiched, and which carry nuts 46. Thus pivotal movement of the arm 35 which causes upwards arcuate movement of the wheel relative to the body 23 is resisted by compression of the rubber in the bush 45. This provides a resilient suspension for the wheel of the castor, which is operable independently of the biasing means described hereafter.

A cam ring 48 surrounds the sleeve 29, the cam ring being secured to the sleeve by three radially extending screws 49 which extend through the cam ring and engage screw-threaded openings in the sleeve 29. On its undersurface, the cam ring has a cam track including a flat portion 50 followed by, circumferentially of the cam ring, a relatively steeply inclined ramp portion 51, a further flat portion 52, and a shallowly inclined ramp portion 53 which leads back to the flat portion 50. The cam track is engaged by the peripheral surface of a roller 54 which is rotatably mounted on a pin 55 fixed to an upwardly extending bracket 56 secured to the body 23. The orientation of the pin 55 is radial with respect to the swivel axis of the castor. Thus the roller 54 engages appropriate parts of the cam track 50 to 53 according to the position to which the castor has swivelled.

The left hand castor is, as above referred to, and as shown in FIGS. 3 and 4, a mirror image of the right hand castor above described. In particular, the cam track provided on the cam ring of the left hand castor has portions 60, 61, 62, 63 corresponding to the parts 50, 51, 52, 53 of the cam track of the right hand castor, but following one another in the opposite direction circumferentially of the cam ring. Thus the relatively steeply inclined ramp portion 51 of the cam track of the right hand castor is engaged when the right hand castor swivels to the left, whilst the corresponding portion 61 of the cam track of the left hand castor is engaged when the left hand castor swivels to the right.

When a wheelchair provided with castors as above described is travelling straight ahead, any deviation from the straight ahead condition requires one or other of its castors to swivel such that the relatively steep ramp portion 51 or 52 of its cam track is engaged by the roller carried by its swivelling body. Since travel of the roller from the flat portion 50, 60 of the cam track to the flat portion 52, 62 by way of the ramp portion 51, 61 requires downward displacement of the swivel body 23 of the castor relative to the sleeve 29 which is carried by the chassis of the wheelchair, i.e. lifting of the chassis structure of the wheelchair relative to the swivel body of the castor, such movement is resisted. Thus the wheelchair has good directional stability. When the wheelchair is steered to left or right by differential driving of the driven front wheels thereof, which causes swivelling of the castors at the rear of the wheelchair, the castor which is outermost with regard to the direction in which the wheelchair is being steered has its swivelling resisted by travel of the roller up the ramp portion 51, 61 of the associated cam track. Thus excessive swivelling of that castor, which could cause the oversteer condition above referred to, is resisted.

Since when the wheelchair is travelling and is steered weight is, in effect, transferred to the outermost castor, the oversteer resistance is dependent on such weight transfer and thus to the cornering forces produced.

When the wheelchair is being manoeuvred at low speed and greater swivel angles of the castors are involved, the portions 50, 52, 53 and 60, 62, 63 of the cam tracks are engaged by the rollers of the castors. Thus such greater angles of swivelling are not resisted to any significant extent.

It will be noted that the offset of the swivel axis of each castor from the rotational axis of the wheel is relatively great. Thus when the wheelchair is being steered sufficient swivelling torque is created to enable the ramp portions of the cam tracks of the castors to be climbed.

It will be further noted that the pivot of the suspension arm 35 to the body 23 of each castor is situated beyond the swivel axis of the castor, so that the suspension arm is relatively long. This assists in the surmounting of obstacles by the castor wheel.

Figure 6:
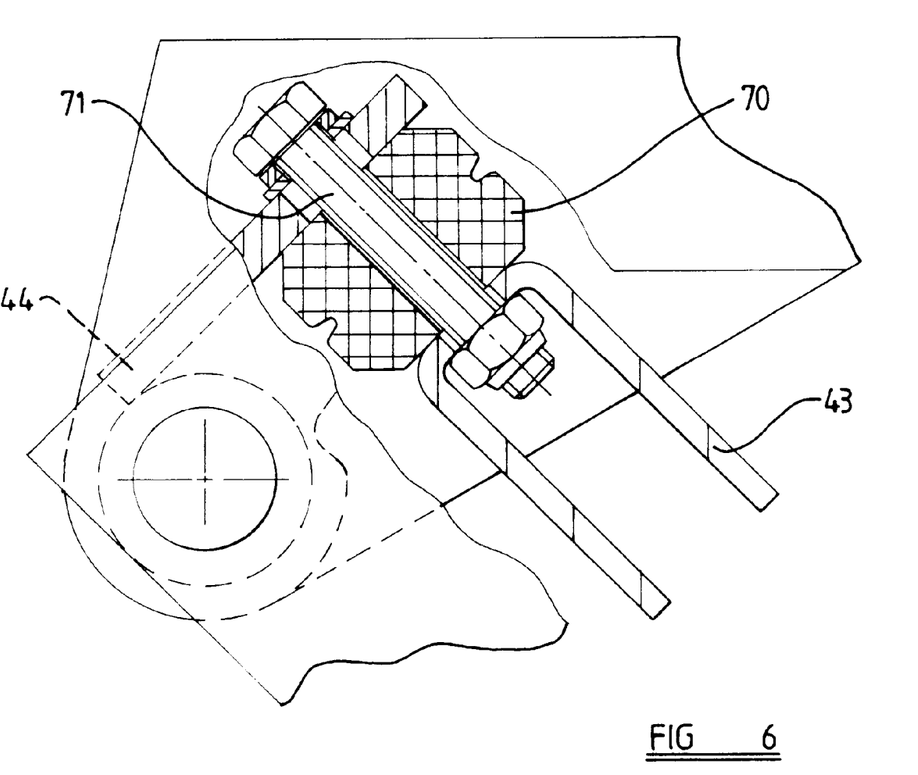
FIG. 6 is a view as FIG. 5, of a modified embodiment of castor.

Referring now to FIG. 6 of the drawings, this shows part of a castor which differs in minor constructional details only from the castor shown in FIG. 5. The castor has a bracket 43 attached to its pivoted arm, and an abutment 44 fixed across the swivelling body of the castor, but instead of the bonded metal-rubber-metal bush 45 therebetween there is an annular element 70 of rubber therebetween. A bolt 71 extends from the bracket 43 towards and through an aperture in the abutment 44, and extends through the opening in the centre of the element 70 so that the latter is held captive in the required positions. The external surface of the resilient element 70 is appropriately configured, e.g. with frusto-conical end portions and an intermediate annular groove, to give it the required resilient characteristics when compressed between the bracket 43 and abutment 44. In use, the operation of the castor of FIG. 6 is exactly the same as that of the castor of FIG. 5.

Figure 7:
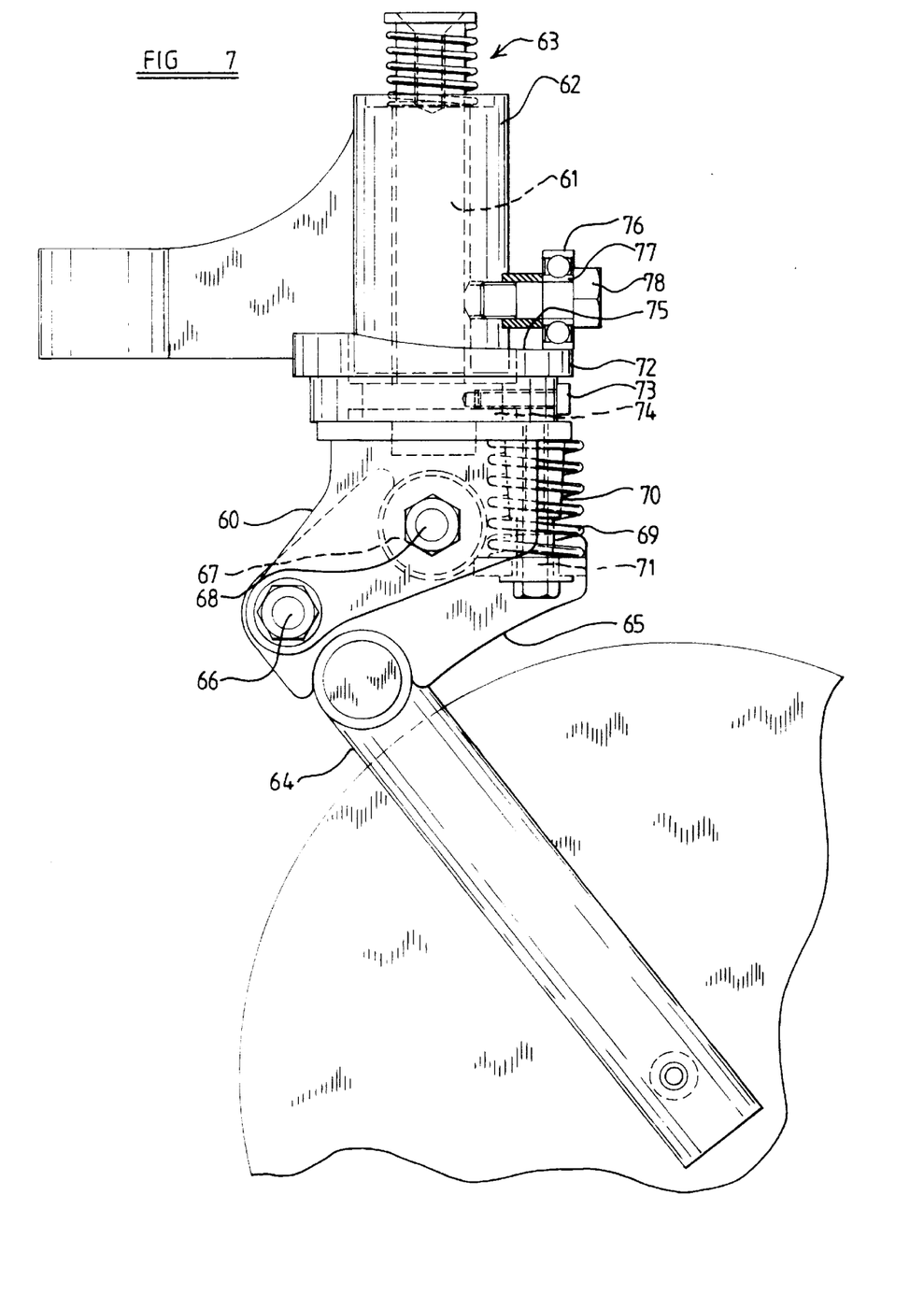
FIG. 7 is a side elevation, partly in section, of a further modified embodiment of castor.

Referring finally now to FIG. 7 of the drawings, this shows a further embodiment of castor which may be utilised in a vehicle such as a wheelchair in accordance with the invention. This castor has a swivel body 60 similar to that of the previously described castors, having a swivel pin 61 extending upwardly therefrom and pivotable within bushes in a sleeve 62. The swivel pin 61 extends above the top of the sleeve 62 and is retained by a retaining spring and washer assembly indicated generally at 63. A suspension arm 64 extends from a member 65 which is pivotable relative to the body 60 about a pivot pin 66. The body 65 engages an annular elastomeric element 67 extending across the swivel body 60 and held on a bolt 68.

There is also a coil compression spring 69 operative between the member 65 and the body 60. The spring is constrained by a guide member 70 on a bolt 71 secured to the body 60 and extending with a clearance through an opening in the member 65. The presence of coil spring 69 in addition to the elastomeric, e.g. rubber, element 67, overcomes any potential problem of the elastomeric elements suffering from creep.

Above the body 60 the swivel pin 61 carries a cam ring 72, the cam ring being secured by radially extending screws 73 to a boss 74 above the body. The cam ring has on its upwardly facing surface a cam track 75, engaged by the peripheral surface of a roller 76. As illustrated, the roller 76 is the outer race of a rolling element bearing whose inner race 77 is carried on a bolt 78 radially engaging the sleeve 62. The configuration of the cam tracks 75 is designed to provide the same operating characteristics as those above described in relation to the castor shown in FIGS. 3, 4 and 5 of the drawings, but as compared with the earlier castor the modified arrangement of cam track and cam follower reduces the risk of fouling between these two elements.

It is to be appreciated that castors as above described will be usable in vehicles of other configuration than wheelchairs as shown in FIG. 1. The castors may find application in vehicles which are not powered, e.g. trolleys or the like.

We claim:

1. A vehicle comprising a front part, a rear part, a left hand side part, and a right hand side part; a pair of wheels spaced laterally of the front part; means for driving said wheels whereby the vehicle is propelled and steered; a first castor wheel assembly mounted at the rear part along the right hand side part, a second castor wheel assembly mounted at the rear part along the left hand side part, each said castor wheel assembly comprising a ground-engaging wheel and means supporting said ground-engaging wheel for rotation about a substantially horizontal rotational axis and for swivelling movement about a substantially vertical swivelling axis, a biasing means for providing a resistance to swivelling of the ground-engaging wheel of the castor wheel assemblies from a straight-ahead position whereby said first castor wheel assembly has its biasing means arranged to cause a different resistance from said biasing means of said second castor wheel assembly and whereby said second castor wheel assembly has its biasing means arranged to cause a different resistance from said biasing means of said first castor wheel assembly in respect of like swivelling movements of the castor wheel assemblies, said biasing means comprising a cam and follower mounted for relative axial displacement in response to swivelling movement, and means for resisting said relative axial displacement of said cam and follower thereby resisting swivelling movement of the castor wheel assemblies.

2. A vehicle according to claim 1 wherein the first castor wheel assembly has its biasing means arranged to come into effect when the first castor wheel assembly swivels in one direction from the straight-ahead position, and wherein the second castor wheel assembly has its biasing means arranged to come into effect when the second castor wheel assembly swivels in the opposite direction from the straight-ahead position.

3. A vehicle according to claim 2 wherein the second castor wheel assembly has its biasing means arranged to come into effect when the vehicle is traveling forward and steering to the right, and wherein the first castor wheel assembly has its biasing means arranged to come into effect when the vehicle is traveling forward and steering to the left.

4. A vehicle according to claim 1 wherein said relative axial displacement is resisted by a proportion of the weight of the vehicle carried by the castor wheel assembly.

5. A vehicle according to claim 1 wherein said relative displacement is resisted by spring means.

6. A vehicle according to claim 1 wherein each castor wheel assembly incorporates suspension means.

7. A vehicle according to claim 6 wherein the suspension means comprises a pivoted arm by which the ground-engaging wheel of each castor wheel assembly is carried, pivotal movement of the arm being resisted by resilient means.

8. A vehicle according to claim 7 wherein the resilient means comprises an elastomeric element which is compressed upon pivotal movement of the arm such that the ground-engaging wheel moves upward relative to the chassis.

9. A vehicle according to claim 7 wherein the resilient means comprises a spring.

10. A vehicle according to claim 7 wherein the pivoted arm is a trailing arm.

11. A vehicle according to claim 1 which is a wheelchair.

12. A vehicle including a chassis having a front part, a rear part, a left-hand side, and a right hand side; a pair of front wheels spaced laterally of the chassis and mounted at the front part; a means for driving said front wheels whereby the chassis is propelled and steered; a first castor wheel assembly mounted at the rear part along the right hand side, a second castor wheel assembly mounted at the rear part along the left hand side, each castor wheel assembly comprising a ground-engaging castor wheel and means for supporting the ground-engaging castor wheel for rotation about a rotational axis and for swivelling movement in a clockwise and in a counter-clockwise direction about a substantially vertical swivel axis; and, a biasing means operatively engaging each said castor wheel assembly for providing resistance to like swiveling movements of the castor wheels from a straight-ahead position, wherein the second castor wheel assembly has its biasing means arranged to come into effect only when the chassis is traveling forwards and steering to the right, and wherein the first castor wheel assembly has its biasing means arranged to come into effect only when the chassis is traveling forwards and steering to the left.

13. A vehicle according to claim 12 wherein each castor wheel assembly incorporates a suspension means.

14. A vehicle according to claim 13 wherein the suspension means comprises a pivoted arm by which the ground-engaging castor wheel of each castor wheel assembly is carried, pivotal movement of the arm being resisted by resilient means.

15. A vehicle according to claim 14 wherein the resilient means consists of one or more selected from the group consisting of: springs and elastomeric elements.

16. A wheel chair comprising a chassis, a pair of wheels mounted for rotation at a front part of the chassis, a means for driving said wheels whereby the vehicle is propelled and steered by differential driving of the front wheels, and a pair of castor wheel assemblies mounted at a rear part of the chassis, each said castor wheel assembly including a ground-engaging castor wheel, a means for supporting said ground-engaging wheel for rotation about a substantially horizontal axis and for pivoting about a substantially vertical swivelling axis in a clockwise and a counter-clockwise direction, and a means for resisting the swivelling of the ground-engaging castor wheel in at least one of said clockwise and counter-clockwise directions, said means for resisting including biasing means incorporated in each castor wheel assembly for providing resistance to like swivelling movement thereof from a straight-ahead position, wherein a first castor wheel assembly of said pair of castor wheel assemblies has a biasing means arranged to cause a different resistance from a biasing means of a second castor wheel assembly of said pair of castor wheel assemblies and whereby said second castor wheel assembly has its biasing means arranged to cause a different resistance from said biasing means of said first castor wheel assembly, both resistances in response to like swivelling movements of the castor wheel assemblies.

17. The wheel chair of claim 16 wherein said means for resisting swivelling of the ground-engaging castor wheel includes a cam and follower mounted for relative axial displacement when said ground-engaging castor wheel pivots about said swivelling axis, and a means for resisting said relative axial displacement of said cam and follower.

18. The wheel chair of claim 17 wherein said relative axial displacement is resisted by a proportion of a weight of the vehicle carried by the castor wheel assembly.

19. The wheel chair of claim 16 wherein each castor wheel assembly incorporates suspension means including a pivoted arm by which the ground-engaging wheel of each castor wheel assembly is carried, pivotal movement of the pivoted arm being resisted by resilient means.

20. The wheel chair of claim 19 wherein the resilient means comprises an elastomeric element which is compressed upon pivotal movement of the arm such that the ground-engaging wheel moves upward relative to the chassis.

* * * * *